United States Patent [19]

Takubo

[11] Patent Number: 4,625,243
[45] Date of Patent: Nov. 25, 1986

[54] HAND-HELD TV CAMERA
[75] Inventor: Takayuki Takubo, Yokohama, Japan
[73] Assignee: Victor Company of Japan, Limited, Yokohama, Japan
[21] Appl. No.: 496,022
[22] Filed: May 19, 1983
[30] Foreign Application Priority Data
  May 25, 1982 [JP] Japan .............................. 57-76598[U]
[51] Int. Cl.[4] .............................................. H04N 5/30
[52] U.S. Cl. ..................................... 358/229; 358/906
[58] Field of Search ...................... 358/229, 906, 209; 354/82, 288; 352/243

[56] References Cited

U.S. PATENT DOCUMENTS 3,078,757 2/1963 Austin et al. ........................... 354/82
3,845,238 10/1974 Schneider et al. ................... 358/209
3,922,694 11/1975 Davis ..................................... 354/82
3,974,522 8/1976 Fukatsu et al. ...................... 358/906
4,363,051 12/1982 Maeda et al. ........................ 358/906
4,378,572 3/1983 Hoffmann ............................ 358/906

*Primary Examiner*—Gene Z. Rubinson
*Assistant Examiner*—Stephen Brinich
*Attorney, Agent, or Firm*—Jordan and Hamburg

[57] ABSTRACT

A hand-held color TV camera includes a grip mounted on a lens casing and a mechanism built in a rear portion of the grip for connecting a camera cable to the camera. A button for remote controlling the start and stop of a recording apparatus is positioned in a rear section of the grip. Strap cooperative with the grip is fastened to a lower portion of the grip.

5 Claims, 1 Drawing Figure

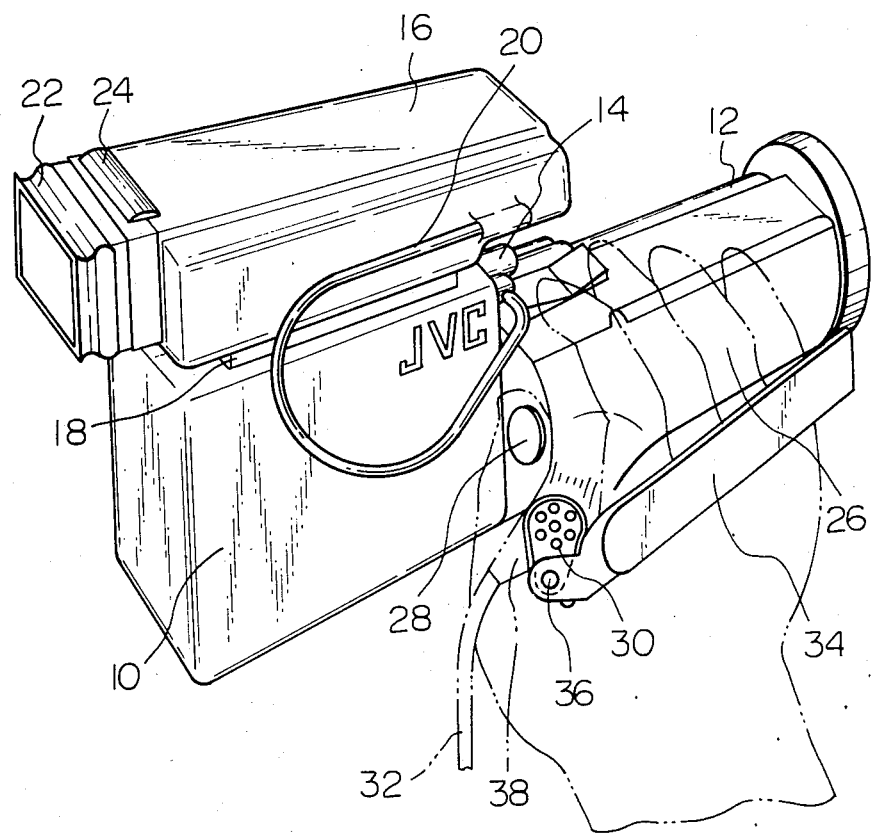

HAND-HELD TV CAMERA

BACKGROUND OF THE INVENTION

The present invention generally relates to TV cameras and, more particularly, to a hand-held color TV camera which is easy to handle, stable in position during operation and suitable for a small size design.

A TV camera may be connected to a video recorder or like recording apparatus by a camera cable when it is operated to pick up desired images. In a prior art TV camera, the camera cable has been coupled to a connection mechanism which is installed in a rear lower portion of a body of the camera.

However, in parallel with the progress in the art of integrated circuits and semiconductor photoelectric transducers, tendency is increasing today toward camera bodies of smaller dimensions. The proportion of the connection device, therefore, has increased to the whole camera body to a critical extent in view of the demand for a reduction in size of the camera body.

Furthermore, in such a prior art camera, the camera cable inevitably extends out from the rear end of the camera body so that the camera tends to become unstable in position while in operation.

SUMMARY OF THE INVENTION

It is therefore an object of the present invention to eliminate the drawbacks inherent in the prior art hand-held TV camera or video camera.

It is another object of the present invention to provide a hand-held TV camera or video camera which is smaller in size than the prior art one.

It is another object of the present invention to provide a hand-held TV camera or video camera which features excellent stability in use.

It is another object of the present invention to provide a hand-held TV camera or video camera which is simple in construction.

It is another object of the present invention to provide a hand-held TV camera or video camera which facilitates manipulation.

It is another object of the present invention to provide a generally improved hand-held TV camera or video camera.

A camera embodying the present invention comprises a camera body and a lens system located in front of the camera body and accommodated in a casing. A grip is mounted on a side of the lens system casing. A connector is provided for connecting to the camera a camera cable which connects the camera to a recording apparatus. The connector is positioned in a portion of the grip which neighbors the camera body.

In accordance with the present invention, a hand-held color TV camera includes a grip mounted on a lens casing and a mechanism built in a rear portion of the grip for connecting a camera cable to the camera. A button for remote controlling the start and stop of an operation of a recording apparatus is positioned in a rear section of the grip. A strap cooperative with the grip is fastened to a lower portion of the grip.

The above and other objects, features and advantages of the present invention will become apparent from the following detailed description taken with the accompanying drawings.

BRIEF DESCRIPTION OF THE DRAWINGS

Single FIGURE is a perspective view of a hand-held color TV camera embodying the present invention.

DESCRIPTION OF THE PREFERRED EMBODIMENT

While the hand-held TV camera of the present invention is susceptible of numerous physical embodiments, depending upon the environment and requirements of use, a substantial number of the herein shown and described embodiment have been made, tested and used, and all have performed in an eminently satisfactory manner.

Referring to the single FIGURE, the hand-held color TV camera of the present invention is shown in a perspective view. As shown, the TV camera comprises a camera body 10. An imaging or lens system is accommodated in a casing 12 which is mounted on the front end of the camera body 10 together with a microphone 14. An electronic view finder 16 is detachably mounted on the top of the camera body 10 through a view finder mount section 18, which is associated with a camera head.

A cable 20 provides electrical interconnection between the view finder 16 and the camera body 10.

The view finder 16 is provided with an eyepiece 22 as illustrated. The eyepiece 22 is pivotable about a hinge 24 relative to the rest of the view finder 16.

Mounted on one side of the lens casing 12 is a grip 26 which will be held by hand as will be described. The grip 26 carries at its rear end a button 28 which is accessible for remote controlling the start and stop of operation of a video recorder or like recording apparatus (not shown). Also carried at the rear end of the grip 26 is a camera output terminal 30 into which a camera cable 32 will be plugged to connect the camera to the recording apparatus.

A strap 34 is positioned at a lower portion of the side of the grip 26. The strap 34 is fastened to the grip 26 by a metal fixture 36 which is positioned below the camera output terminal 30.

To use the color TV camera, one inserts his or her right-hand fingers from below into the gap between the grip 26 and the strap 34. The index, middle, ring and little fingers are layed on the grip 26 while the thumb is positioned to operate the start/stop button 28 as desired.

Therefore, when a terminal 38 of the camera cable 32 is plugged into the camera output terminal 30 under the condition described above, the cable 32 together with the terminal 38 will protrude to the outside between and beyond the thumb and the index finger.

The construction described above makes it needless to build the camera output terminal 30 in the camera body 10 and, thereby, promotes a decrease in the overall dimensions of the camera body 10.

Furthermore, the camera cable 32 in this particular embodiment extends from a section where the camera body 10 and lens casing 12 join each other, i.e., substantially at the center of gravity of the whole camera. This will keep the camera in a stable position if an unexpected force is applied to the camera cable for one reason or another, compared to the prior art camera having a camera cable which extends out from the rear end of the camera body. The cable 32 in such a position will not interfere with the manipulation of the camera. Moreover, the start/stop switch 28 and camera output terminal 30 are located adjacent to each other and, therefore, a short wiring will suffice therebetween.

In summary, it will be seen that the hand-held color TV camera of the present invention frees its camera body of a camera cable connection mechanism and thereby makes it small in size. This is implemented by a grip mounted on a lens section of the camera and a camera cable connection mechanism built in the grip. Meanwhile, because an arrangement is made such that when the grip is held by the right hand, the camera cable connection mechanism is located between the thumb and the index finger, the camera can pick up images stably if the camera cable is subjected to an external force accidentally. While the camera is in use, the camera cable will not obstruct the manipulation of the camera at all.

Although the present invention has been shown and described in conjunction with a color TV camera, it will be apparent that it finds other various applications such as black-and white TV cameras and video cameras, whether for industrial use or for family use.

Various modifications will become possible for those skilled in the art after receiving the teachings of the present disclosure without departing from the scope thereof.

What is claimed is:

1. A camera comprising, in combination:
   a camera body;
   a lens system located in front of said camera body and accommodated in a lens casing, said lens system having an optical axis;
   grip means mounted on a side of said lens casing and extending parallel to said optical axis, said grip means having a rear end portion disposed in front of and laterally to one side of said camera body;
   connecting means for connecting to the camera a cable which connects the camera to a recording apparatus, said connecting means being positioned at said rear end portion of the grip means which is adjacent to the center of gravity of the whole camera; and
   a button for remotely controlling the start and stop of the operation of the recording apparatus, said button being positioned at said rear end portion of the grip means which is adjacent to the camera body.

2. A camera as claimed in claim 1, further comprising a strap fastened to a lower portion of said connecting means.

3. A camera as claimed in claim 1, in which the connecting means comprises a projection which extends at an obtuse angle relative to said optical axis.

4. A camera as claimed in claim 3, in which the projection has a camera output signal terminal embedded in a tip thereof.

5. A camera as claimed in claim 1, in which the camera comprises a TV camera.

* * * * *